(12) United States Patent
Anderson et al.

(10) Patent No.: US 9,055,734 B1
(45) Date of Patent: Jun. 16, 2015

(54) DEVICE FOR LOADING LIVESTOCK VIA CONVEYOR BELT

(76) Inventors: Joshua Dean Anderson, Marshall, MN (US); Douglas Dean Anderson, Marshall, MN (US)

( * ) Notice: Subject to any disclaimer, the term of this patent is extended or adjusted under 35 U.S.C. 154(b) by 953 days.

(21) Appl. No.: 12/925,609

(22) Filed: Oct. 26, 2010

(51) Int. Cl.
*A01K 45/00* (2006.01)
*B65G 41/00* (2006.01)
*B65G 15/26* (2006.01)

(52) U.S. Cl.
CPC ............ *A01K 45/005* (2013.01); *B65G 41/002* (2013.01); *B65G 15/26* (2013.01)

(58) Field of Classification Search
CPC ..... A01K 45/005; B65Q 41/002; B65Q 15/26
USPC ................................................. 119/845, 846
See application file for complete search history.

(56) References Cited

U.S. PATENT DOCUMENTS

| | | | |
|---|---|---|---|
| 3,253,577 A | 5/1966 | Lund | |
| 3,389,690 A | 6/1968 | Jerome | |
| 3,389,780 A | 6/1968 | Jerome | |
| 3,420,211 A | 1/1969 | Hartvickson | |
| 3,452,718 A | 7/1969 | Wight | |
| 3,476,089 A | 11/1969 | Jerome | |
| 3,602,198 A | 8/1971 | Tackett | |
| 3,702,600 A | 11/1972 | Bright et al. | |
| 3,722,477 A | 3/1973 | Weldy et al. | |
| 3,958,536 A | 5/1976 | Crowder | |
| 4,074,658 A | 2/1978 | Mermelstein et al. | |
| 5,325,820 A | 7/1994 | Briggs et al. | |
| 5,469,815 A | 11/1995 | Stross | |
| 5,699,755 A * | 12/1997 | Wills et al. | 119/846 |
| 5,706,765 A * | 1/1998 | Horton | 119/846 |
| 5,743,217 A | 4/1998 | Jerome | |
| 5,915,338 A | 6/1999 | Fitzsimmons et al. | |
| 6,109,215 A | 8/2000 | Jerome | |
| 6,347,604 B1 | 2/2002 | Lapere et al. | |
| 6,447,234 B2 | 9/2002 | Sinn et al. | |
| 6,454,510 B1 | 9/2002 | Sinn et al. | |
| 6,564,751 B2 | 5/2003 | Anderson et al. | |
| 6,880,488 B1 | 4/2005 | Hall | |
| 6,976,454 B2 | 12/2005 | Cattaruzzi | |
| 7,281,496 B2 | 10/2007 | Calabria et al. | |
| 2002/0015635 A1* | 2/2002 | Sinn et al. | 414/346 |
| 2004/0050653 A1 | 3/2004 | Mola | |

* cited by examiner

Primary Examiner — Son T Nguyen (57) ABSTRACT

Device for conveyor belt livestock loading with pre-loader having conveyor belt, main conveyor, comprising a lift section, top section, and also having an auto-loader section.

4 Claims, 11 Drawing Sheets

DEVICE FOR LOADING LIVESTOCK VIA CONVEYOR BELT

CROSS REFERENCE TO RELATED APPLICATIONS

Not applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND

This invention relates generally to the field of livestock handling and more specifically to device for conveyor belt livestock loading.

As the production and processing of livestock, in particular poultry, has become centralized with thousands of animals raised and housed in one location and hundreds of thousands of animals processed in one location, the need arose to efficiently transport large numbers of animals from point of origin to the processing plants or other locations. Therefore, customized vehicles able to contain the maximum number of animals and loading methods to load the maximum number of animals most quickly with the least amount of stress upon and aggravation of said animals have been devised.

At present, the most common transportation means, particularly for poultry, is a flat bed trailer having cages or coops arranged side by side to form horizontal tiers and vertical columns. And the most popular loading means is a device having a conveyor system having a plurality of different moving belts communicating with the ground, where animals may be herded thereonto, and the interior of a coop where the animals may be deposited thus filling said coop.

These devices generally have a main conveyor system which may be individually raised or lowered, and which transfers animals to another loading conveyor belt which extends into the coop being loaded. This loading conveyor belt is progressively withdrawn as it moves animals into the coop as the coop is filled. Then, the coop is closed and the conveyor system is raised or lowered to the next coop and the process repeated.

When each coop in a column has been loaded, the trailer is moved to align a new empty column of coops with the loader. This process is repeated until each column is filled. These present technologies have disadvantages which the extant art defeats or over which it provides improvements as described below.

The head of the loader, in the instant art, below termed the "major assembly, is an improvement in that it has a main conveyor belt which extends and retracts automatically in response to lift or descents, by employing electrical control of extension or retraction device, and a serpentine belt, the effective length of which can be automatically extended or foreshortened, as necessary. This allows employment of a more compact configuration, greatly increasing overall convenience and ease of operation.

This major assembly includes an operator station, and an autoloader which has a discrete conveyor belt that reaches to, and into, the coops being loaded. The main conveyor belt extends and retracts as necessary to maintain a fixed distance relationship between it and the interiors of the receiving coops. It also tilts automatically to keep itself parallel to the plane of its transport and support frame.

This is accomplished automatically, by providing sensor, receiver, and transmitters in the supporting extension or retraction devices, in example the lift-cylinder mechanism, the extension-cylinder mechanisms, and tilt-cylinder mechanisms. A processor reads the sensor, receiver, and transmitter, receiver, and transmitters, and manages the three, simultaneously to keep them where they need to be.

Because this design provides the described automatically and constantly maintained orientation relative to the coops being loaded, it can use a foreshortened autoloader. Accordingly, the associated moving parts can be, and are, smaller and lighter, thereby exerting less stress on other parts of the device. This is in contrast to other previous technologies that accomplish the loader to coop distance adjustment manually via hydraulics, such as Calabria et al., U.S. Pat. No. 7,281,496 B2. Such technologies require the operator to manipulate a lever to move the end of the loader in and out. But without a serpentine belt, this requires a longer autoloader.

Further, the instant technology employs electric controls instead of previously popular pneumatic or hydraulic controls. This feature significantly reduces the amount of unwieldy and bulky plumbing, increases ease of use, and makes more control options available. In example, no fluid bearing lines need run from fluid source to operator station, there communicating with control valves accessible by an operator, to extension or retraction means, but only need to run from fluid source to extension or retraction device. Other included embodiments eliminate hydraulic systems altogether.

In another example, Anderson et al., U.S. Pat. No. 6,564,751 B2 the loader does not extend and retract, but, instead, maintains distance relative to the loading coop by use of a scissor hoist. As a result, it needs a longer autoloader, because the end of its main belt doesn't extend with the head. Therefore, extra length is required to take up where the main belt fails short.

In the instant technology, the preloader can be stored inside a tunnel inherent to the design configuration. It is loaded into this position letting the main conveyor belt or a winch pull it forward until it rests entirely supported by the main conveyor belt. This stands in contrast to other designs, such as U.S. Pat. No. 7,281,496 B by Calabria, and Anderson et al., U.S. Pat. No. 6,564,751 B2, which require the preloader to be propped up in an upright position from the back of the device. In such a propped-up position, it exerts extreme stress on the driveshaft on which it pivots.

Other devices, such as Anderson et al., U.S. Pat. No. 6,564,751 B2 and Calabria et al., U.S. Pat. No. 7,281,496 B2, have a preloader that pivots on the driveshaft up front. When the device is transported, the preloader folds in half, and sits upright, in a vertical position. In that position, normal "bouncing" as the device travels, even on a prepared roadway, puts enormous stress on that shaft.

The instant design employs plastic modular belts, which are more humane, than previous technologies and are also self-lubricating, slip-proof, and self-positioning.

In example, Calabria et al. U.S. Pat. No. 7,281,496 B2, uses a rubber conveyor belt. With such a belt, an operator must constantly monitor and adjust it to make sure it is running straight, and keep the rollers straight to prevent the belt from "walking" one way or another. In contrast, the instant art uses sprockets to drive the belts, so, there is no problem with the belt "walking." It is essentially self-positioning. Rubber belts also slip when wet, or icy. In contrast, sprockets of the instant art prevent the belt from doing slipping.

Other example devices, such as Anderson et al., U.S. Pat. No. 6,564,751 B2 use a belt of metal cleated chain. Such a chain is exceedingly heavy. Further, it is inhuman in that it has openings through which the feet of livestock can drop.

This technology also includes debri-clearing augers organic to the system. The lower or intake end of each conveyor-belt rolls around an idler shaft having a gently-auger shaped surface. The auger-shaped surface resembles two worm gears originating end-to-end at the center of the shaft and twisting outward toward the shaft ends. As the upper, load-conveying surface of the belt goes forward, the lower, returning portion of the belt brings trash and debris inside it towards the intake end of the belt. When this trash and debris reaches the intake end of the belt, it flows with the belt up and around the intake side of the idler shaft. Then, flowing over the top of the shaft, it falls back onto the belt on the other side of the shaft and is cycled around it again. However, each time the trash and debris flows over the shaft, the auger-shaped surface moves it a little more towards the ends of the shaft, until the trash and debris falls clear of the device, entirely.

Thus, this new technology reduces the time required to load a trailer and reduces the stress on animals being loaded, thereby advancing the art of loading livestock onto trailers.

BRIEF SUMMARY OF THE INVENTION

The primary object of the invention is to accomplish faster loading of livestock, especially poultry, into cages or coops arranged in columns and tiers on a semi-trailer.

Another object of the invention is loading of livestock using a series of conveyor belts permitting significantly more continuous operation.

Another object of the invention is to minimize the stress and disturbance on livestock being loaded into cages or coops.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a device for loading livestock using a pre-loader having a conveyor belt, a main conveyor section having a conveyor belt, a lift section, a top section, and an auto-loader section.

In accordance further with a preferred embodiment of the invention, there is disclosed a process for livestock loading comprising the steps of: herding livestock onto a pre-loader which transfers the livestock to a main conveyor section having a top section, which transfers the livestock to an auto-loader section, comprising an extendable or retractable conveyor belt.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF NUMBERED COMPONENTS

110 Loader
112 Pre-loader
114 Main conveyor section
116 Lift section
118 Top section
120 Major assembly
124 Auto-loader section
125 Operator station
126 Lift-cylinder mechanism
127 Lift-cylinder mechanism sensor, receiver, and transmitter, receiver, and transmitter
128 Trailer
129 Auto-loader extension-cylinder mechanism sensor, receiver, and transmitter
130 Leveler
131 Auto-loader extension-cylinder mechanism
132 Top section extension-cylinder mechanism
133 Extension-cylinder mechanism sensor, receiver, and transmitter
134 Semi-trailer
136 Coop
138 Tier
140 Take up section
142 Rollers
143 Gap between rollers
144 Weighted rollers
146 Tension weight
148 Belt slack loop
150 Tilt-cylinder mechanism
151 Tilt-cylinder mechanism sensor, receiver, and transmitter
152 Column
154 Livestock (fowl)
156 Pivot point
158 Main conveyor belt
160 Hitch
162 Trailer frame
164 Wheels
166 Main section pivot point
168 Ground
170 Top section drop-end
174 Auto-loader section conveyor belt
178 Pre-loader conveyor belt
180 Central control module
182 Rack
184 Pinion
186 Conveyor belt chain
188 Drive sprocket
190 Operator control input bank
196 Pre-loader receiving section
198 Pre-loader riser section
200 Pre-loader Pivot point
202 Belt pad
204 Belt guide roller
206 Livestock guide
208 Litter panels
210 Livestock barrier
211 Rack and pinion arrangement
212 Intermeshing teeth
214 Pinion shaft
216 Bushing or bearing
218 Motor
220 Rack and pinion sensor, receiver, and transmitter
230 Debris
232 Auger
234 Auger shaft
236 Helical ridge or thread
238 Conveyor belt upper loop upper part
240 Conveyor belt loop lower part
242 Conveyor belt loop outer surface
244 Conveyor belt loop inner surface
246 Auger gear or sprocket 248 Track
250 Teeth
252 Conveyor belt loop
254 Tie down
256 Cushion
258 Storage compartment
260 Winch
Distance X
Arc B
Direction A
Angle L Loader angle
Angle M
Angle M'
Angle N
IS Ideal slope

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The instant art deals with structures using arrangements of conveyor belts and coordinating of the speeds of some relative to others, all of which are well known in the art. Therefore such structures, types and arrangements of conveyor belts and methods of coordination of various conveyor belt elements will not be described in meticulous detail. Also, one may readily appreciate that automated livestock loaders may comprise elements having nothing to do with the inventive steps of the instant art, in example walls and/or roof covers, which, for clarity, will therefore not be depicted nor described in great detail.

When used in reference to conveyor belts, the term "variable" may refer to length of conveyor belt, speed of conveyor belt, extension or retraction of conveyor belt and/or direction of motion of conveyor belt, as apparent from the context.

The term "ground" may refer to the earth surface or any other surface upon which livestock may tread prior to communication with the instant art or any surface upon which the instant art or other livestock conveyance may travel or rest.

The terms "lift cylinder," "extension cylinder," and "tilt cylinder" are understood to refer to extendable or retractable hydraulic or pneumatic cylinders. In addition, those well versed in the art will readily appreciate that other means of accomplishing the functions of hydraulic and/or pneumatic cylinders are known and may be exploited in the instant art. In example, elements extended by arrangements of racks and pinions, racks and worm gears, screw jacks, etc. are known and may be substituted.

Figures 1, 1A:
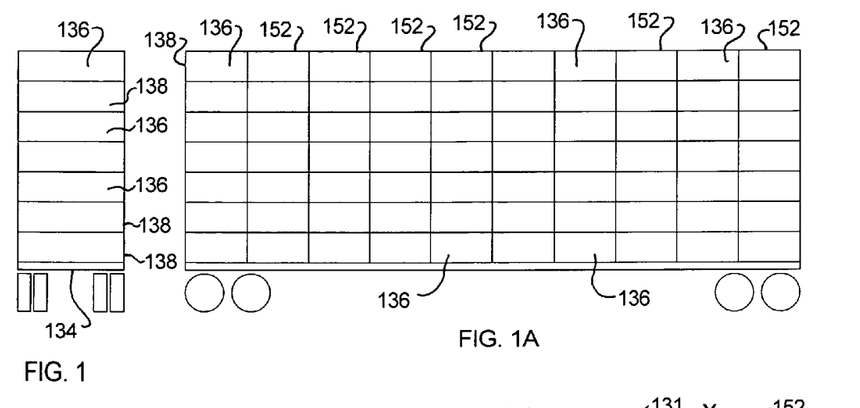
FIG. 1 is a back view of a semi-trailer.
FIG. 1A is a side view of a semi-trailer.

Looking now at FIG. 1 and FIG. 1A, one sees a semi-trailer (134) especially adapted to transport livestock, in particular, poultry. The trailer (134) has a plurality of coops (136) arranged side by side to comprise substantially horizontal tiers (138) stacked one on top of the other forming substantially vertical columns (152). One may readily appreciate that these coops (136) may be of any type well known in the art and may include entry doors that open for loading. The coops (136) may also comprise partitions that open or close to divide the coops (136) into discrete sections. In addition, one may readily appreciate that the coops (136) may be substantially permanently attached to the semi-trailer (134).

Figure 2:
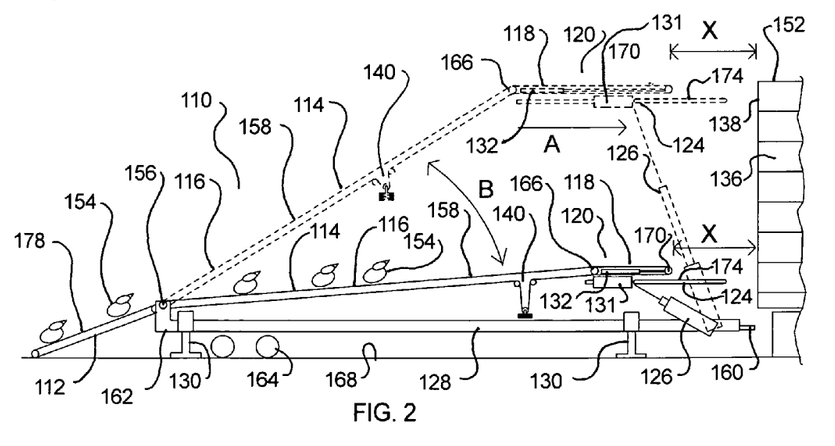
FIG. 2 is a side view of the device and a semi-trailer.
Figure 2A:
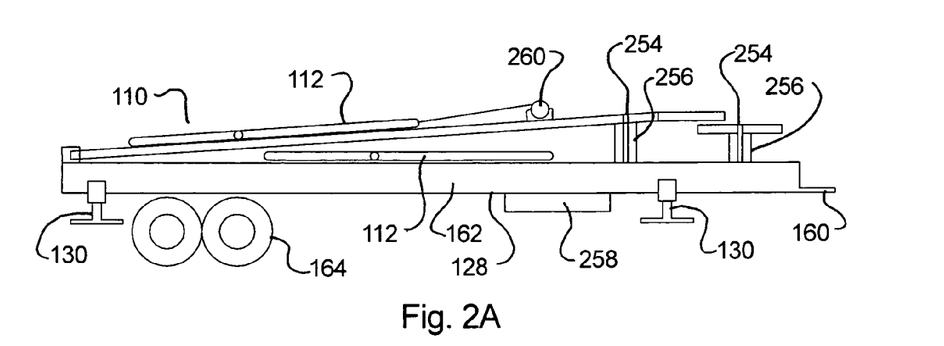
FIG. 2A is a side view of the device.
Figure 2B:
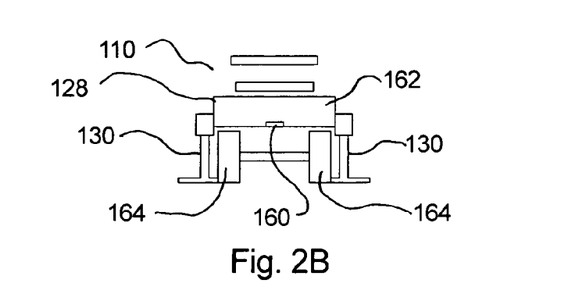
FIG. 2B is a front view of the device.

Turning now to FIG. 2, FIG. 2A, and FIG. 2B, one sees a device (110), for loading livestock (154), in particular poultry, into coops (136) on the trailer (134) in the disposition previously described. The device (110) has a trailer (128) having a frame (162), a hitch (160), levelers (130), and wheels (164) such that the trailer (128) may be moved from place to place and then oriented so that the loading device (110) is in operative position, relative to the semi-trailer (134) comprising columns (152) and tiers (138) of coops (136) as previously described. The levelers (130) may comprise jacks which communicate with the ground (168) and the trailer (128) and when raised or lowered adjust the cant of the trailer and elements communicating therewith to optimal.

Looking further at FIG. 2, one sees that the device (110) also comprises a main conveyor section (114) having a conveyor belt (158). Also, one notes that the main conveyor section (114) comprises a lift section (116) and a top section (118) with the conveyor belt (158) traversing the lift section (116) and the top section (118).

The top section (118) is oriented substantially horizontally, in a plane essentially parallel to the plane of the trailer frame (162), the lift section (116) and the top section (118) having a pivot point (166) there-between, so that the lift section (116) and the top section (118) are articulated, each relative the other.

Figures 4, 4A:
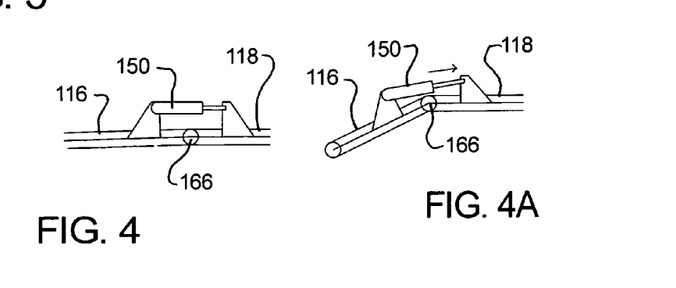
FIG. 4 is a view of articulation means.
FIG. 4A is a view of articulation means.

FIGS. 4 and 4A serve as examples wherein the lift section (116) and the top section (118) may have a tilt-cylinder mechanism (150) anchored therebetween, so that extension or retraction of the tilt-cylinder mechanism (150) will cause the lift section (116) and the top section (118) to pivot each relative the other. Thus, the top section comprises the pivot point (166) and a distal end herein referred to as a drop-end (170), opposite the pivot point (166). Further, one notes that in operative position, the top section (118) is substantially level and the top section drop-end (170) is at an optimal distance from the column of coops (152), distance X. Also shown in FIG. 2 is an extension-cylinder mechanism (132) communicating with the top section (118) whereby the top section (118) may be extended or retracted.

Turning yet again to FIG. 2, one sees that the main conveyor section (114) communicates with the trailer (128) and trailer frame (162) at a pivot point (156) at the end of the main conveyor section (114) opposite the main conveyor section pivot point (166), and by means of a lift-cylinder mechanism (126) attached to the trailer frame (162) and to the main conveyor (114). In addition, one also sees that the loader (110) comprises a major assembly (120) having the top section (118) of the main conveyor section (114), and an auto-loader section (124) having at least one conveyor belt (174).

The top section (118), and auto-loader section (124) are integral structures having conveyor belts possessing independently variable, speed of motion, direction of motion, extension, and/or retraction, (158, 174). Also, one notes a pre-loader (112). This is also an independent structure having a conveyor belt (178) independently variable in speed of motion, direction of motion, extension, retraction, or length relative other conveyor belts (158, 174). It communicates by removable attachment means with the ground (168) and the end of the main conveyor section (114) proximal the pivot point (156).

Additionally, being an integral and removably attachable element, the pre-loader (112) may be oriented on the trailer (128) in such manner that its weight or momentum, if the trailer (128) is moving, is not borne by any other elements excepting the trailer. Further, one notes that in operative position, the top section (118) is substantially level and the top section drop-end (170) is at an optimal distance from the column of coops (152), which distance is distance X.

Attending again to FIG. 2, one sees that the lift-cylinder mechanism (126) may be extended causing the main conveyor section (114) to rise while pivoting at pivot point (156) thusly describing an arc as indicated by double pointed arrow B. One may readily appreciate that by retraction of the lift-cylinder mechanism (126), the main conveyor (114) may be lowered along the same course indicated by double pointed arrow B.

Now one may readily appreciate that as the main conveyor section (114) is lifted and pivoted about pivot point (156) by lift-cylinder mechanism (126) thusly describing the arc (B), the distance X from the top section discharge point, termed the drop-end (170), to the column (152) of coops (136) will tend to increase and the orientation of the top section (118) will tend to vary from substantially horizontal. However, overcoming this tendency, the top section (118) is extendable in direction A by extension-cylinder mechanism (132) and the top section (118) is articulated relative to the lift section (116) by tilt-cylinder mechanism (150).

Therefore, one may readily appreciate that by proper extension of and articulation of the top section (118), the top section (118) may be maintained in substantially horizontal position, remaining in a plane essentially parallel to the trailer frame (162), and the distance X from the top section drop-end (170) to the column (152) of coops (136) may be kept substantially constant. In addition, one may readily appreciate that said coordination may be affected by well known control systems for cylinders (126, 132, 150).

In example, such control may be accomplished by systems exploiting analog or digital processors, stepper motors, servo mechanisms, control and feed back devices and circuitry, and the like. Alternatively, such control may be manual or semi-manual, involving human operators or combinations of any of the above.

In addition, one may readily appreciate that as the main conveyor section (114) is lowered by retraction of lift-cylinder mechanism (126), then the tilt-cylinder mechanism (150) and extension-cylinder mechanism (132) may be retracted in coordinated manner to maintain the top section (118) in a substantially horizontal orientation, essentially in a plane parallel to that of the trailer frame (162), and maintain distance X substantially constant by any of the same aforementioned means or combinations.

Figure 3:
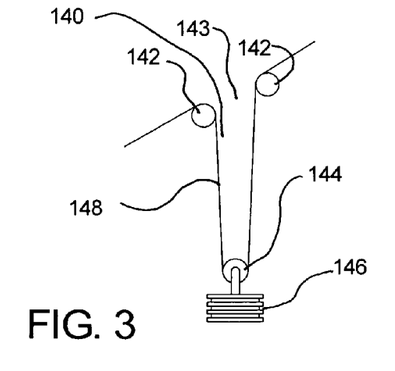
FIG. 3 is a view of slack take up means
Figure 3A:
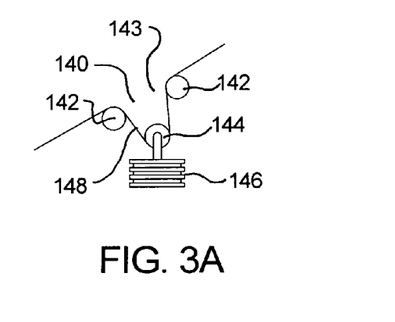
FIG. 3A is a view of slack take up means.

Now, one may readily appreciate that the extension and/or retraction of the top section (118) of the main conveyor section requires a means to take up or play out slack in the main conveyor section conveyor belt (158) sundry of which are known. In example as in FIG. 3 and FIG. 3A, which shows a take-up section (140) wherein the main conveyor section (114) may comprise a gap (143) defined by rollers (142) over which the main conveyor belt (158) may travel, thusly extending a portion of said belt (158) through the gap (143) to comprise a slack loop (148) held taught by a tension weight (146) and a weighted roller (144). Therefore as the top section (118) is extended or retracted the slack loop (148) may increase in size or decrease in size as necessary.

Further, those well versed in the art will readily appreciate any conveyor belt comprised by the instant art may exploit the above slack play out and take up means and that, the auto-loader section (124) and/or the auto-loader section conveyor belt (174) or supporting structures, may communicate with extension-cylinder mechanisms so as to be extendable or retractable in the manner of the top section (118).

Figure 11:
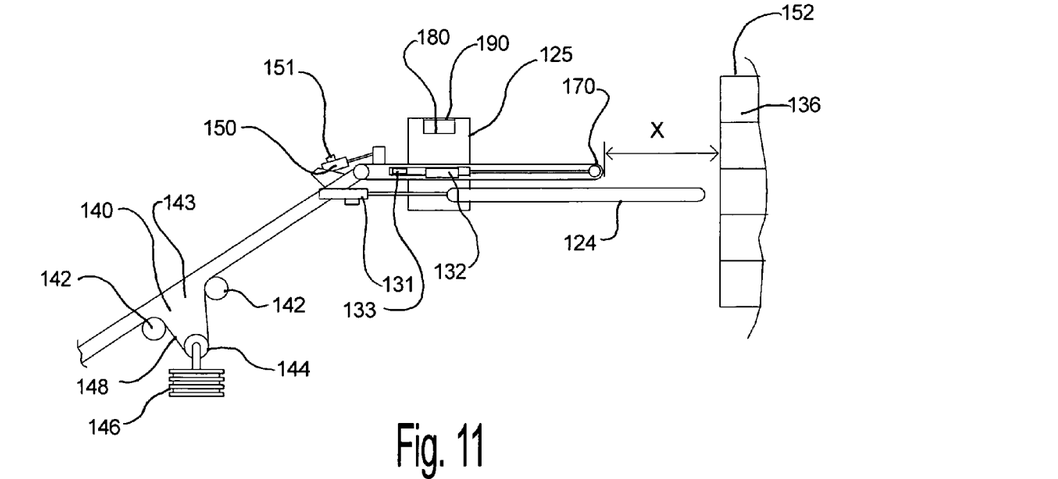
FIG. 11 is a partial side view showing slack.
Figure 11A:
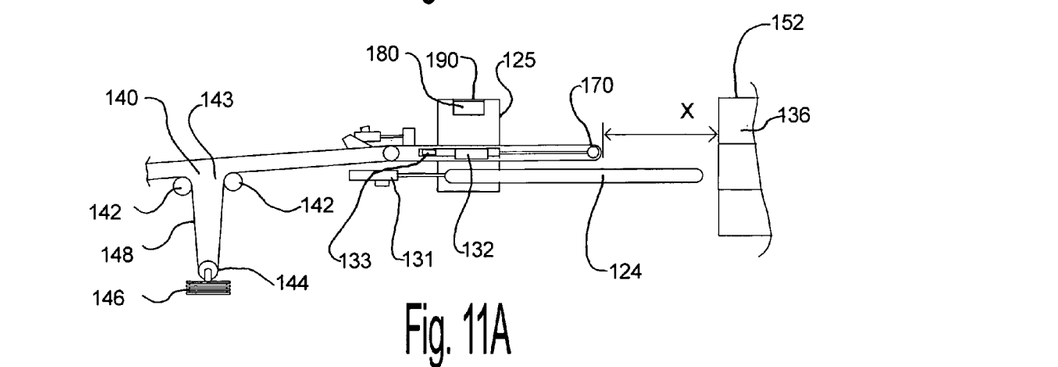
FIG. 11A is a partial side view showing slack.

In example, FIG. 11 shows the major assembly (120) raised and FIG. 11A shows the major assembly (120) lowered. FIG. 2 shows that as the major assembly (120) is raised, the top section (118) is extended to maintain distance X and FIG. 11 shows that such extension takes up the belt slack (148). FIG. 2 also shows that as the major assembly (120) is lowered, the top section drop-end (170) is retracted to maintain distance X. FIG. 11A shows that such retraction adds slack (148). Thus, comparison of FIG. 11 and FIG. 11A shows that when the major assembly (120) is raised, the top section (118) is longer and the slack (148) is shorter and contrarywise, when the top section (118) is lowered, the top section (118) becomes shorter and the slack (148) becomes longer.

Figure 5:
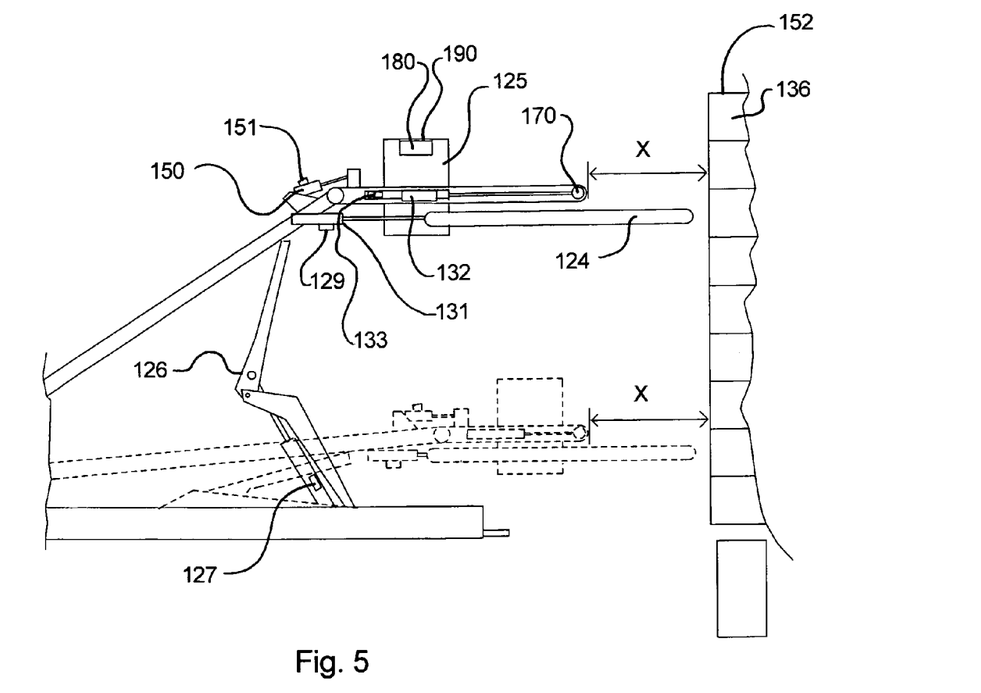
FIG. 5 is a partial view of the device configured for automatic operation.
Figure 5A:
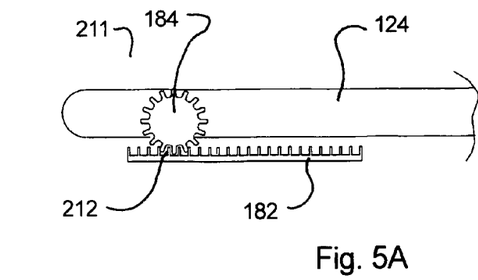
FIG. 5A is a partial side view of alternate extension or retraction means.

In the preferred mode, FIG. 5, the device is automated such that extension or retraction of the lift-cylinder mechanism (126) causes the tilt-cylinder mechanism (150) and extension-cylinder mechanism (132) to automatically extend or retract in such a way as to maintain the top section (118) in an orientation parallel to the trailer frame (162) and maintain a constant distance X from the top section drop-end (170) to the column (152) of coops (136) being addressed. The degree of extension or retraction required of each cylinder to accomplish this may be ascertained and affected in various ways by one skilled in the art.

One example is shown by FIG. 5, wherein the lift-cylinder mechanism (126) comprises a sensor, receiver, and transmitter (127), the top section extension-cylinder mechanism (132) comprises a sensor, receiver, and transmitter (133) and the tilt-cylinder mechanism (150) comprises a sensor, receiver, and transmitter (151). Said sensor, receiver, and transmitters can measure the length of extension or retraction of said cylinders, transmit said data to the control module (180), and receive control signals from said control module (180).

Figure 12:
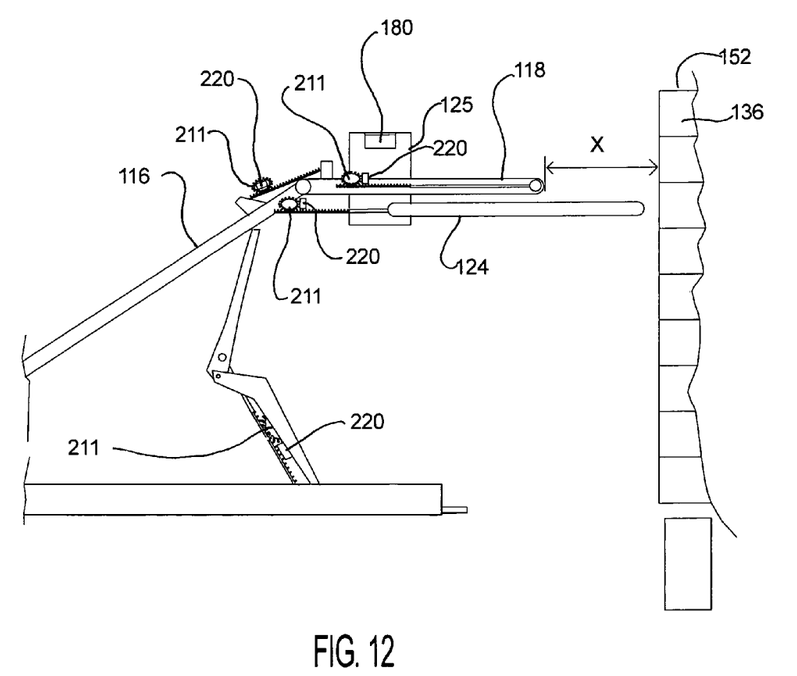
FIG. 12 is a side view of device with alternate extension or retraction means.

Although FIG. 5 employs exclusively hydraulic cylinders to perform lift extension, and tilt functions, FIG. 12 illustrates a manner in which rack and pinion (211) motive force arrangements may be substituted for the hydraulic cylinders.

Then, by means of known trigonometric functions, the control module (180) may calculate the length of extension or retraction of the tilt-cylinder mechanism (150) and/or the extension-cylinder mechanism (132) required to maintain distance X and maintain the top section (118) in proper orientation according to or in response to extension or retraction of the lift-cylinder mechanism (126), and transmit appropriate control commands to relevant cylinders. In addition, the auto-loader extension-cylinder mechanism (131) may comprise a sensor, receiver, and transmitter, receiver, and transmitter (129) to ascertain degree of extension or retraction of the auto-loader section (124) and transmit said data to the central control module (180). The central control module (180) may then transmit commands to the auto-loader section (24) according to said data.

FIG. 5, FIG. 11, FIG. 11A, and FIG. 12 show an operator station (125) comprising a structure to accommodate an operator in standing, seated, or other convenient disposition. Positioned to be easily accessed by said operator is an operator control; bank (190) whereby said operator may control the operation of all instant art operative elements according to his best judgment.

Thus, the instant art (110) may be operated automatically, by an operator, or by combination of operator and automatic systems.

Figure 5B:
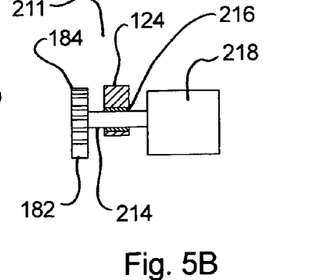
FIG. 5B is a rear view of alternate extension or retraction means.
Figure 5C:
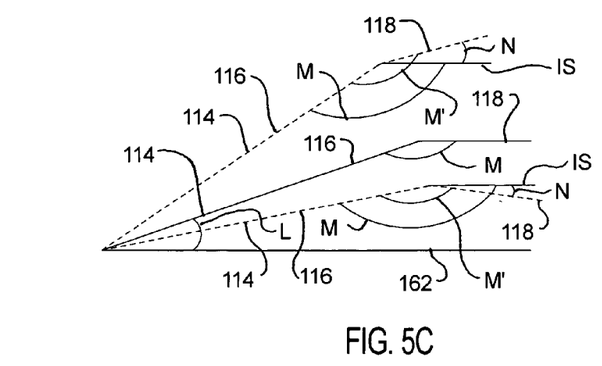
FIG. 5C is a side view of an embodiment of the device.

As depicted in FIG. 5C, it may bee seen that the main conveyor section (114) and the trailer frame (162) comprise a loader angle, Angle L, which is known and that the lift section (116) and the top section (118) comprise Angle M, which is a lift section/top section angle of articulation, which is known. Further, Angle M and Angle L comprise a contrived relationship such that the slope of the top section (118) is optimal. Further, as previously described, the main conveyor section (114) may be raised or lowered which will cause Angle L to vary. The distance raised or lowered may be known, and accordingly, the caused variance of Angle L may be known thus Angle L may be known at any position of the main conveyor section (114).

Also, as the main conveyor section (114) is raised or lowered, the slope of the top section (118) will vary necessitating adjustment of Angle M to return said slope to optimal. Said variance may be illustrated by Angle N which comprises the top section (118) as moved and a Line IS representing ideal slope. Said variance occurs in accordance with variance of Angle L according to relationship which is known. Therefore, Angle N may be known at any disposition of the main conveyor section (114).

Now it may be readily appreciated that the new Angle M, Angle M', required to adjust the slope of the top section (118) to optimal, is simply Angle M minus Angle N if the main conveyor section (114) has been raised or Angle M plus Angle N if the main conveyor section has been lowered. Angle M' may be accomplished by articulation of the top section (118) relative the lift section (116) by means previously described.

Now it may be readily appreciated that in ideal circumstances, the coops (136) will be substantially level. However, if the trailer (134) is not resting upon level ground (68), the coops (136) will be correspondingly slanted. In that case, the angle of the top section (118) and the auto-loader (124) may be adjusted as necessary by appropriate manipulation by the extension-cylinder mechanism (132) and/or tilt-cylinder mechanism (150).

Figure 8:
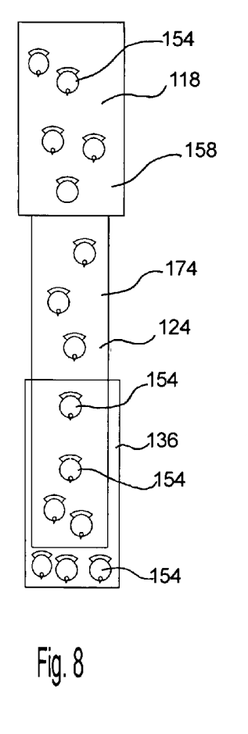
FIG. 8 is a top view of auto-loader extended into coop.
Figure 9:
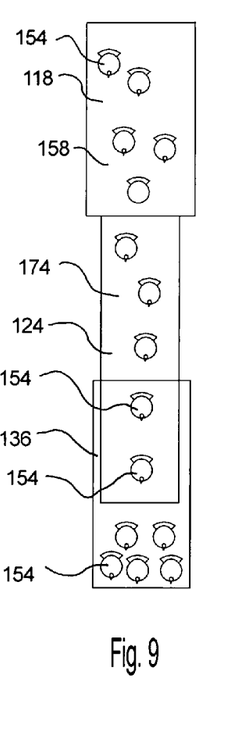
FIG. 9 is a top view of auto-loader partially withdrawn from coop.
Figure 10:
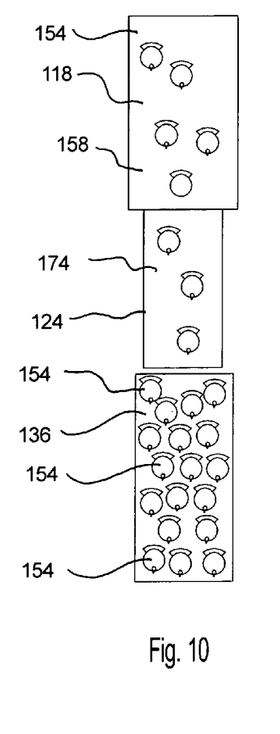
FIG. 10 is a top view of auto-loader fully withdrawn from coop.

Turning now to FIG. 8, FIG. 9 and FIG. 10, one sees a coop (136) with an auto-loader section conveyor belt (174) extending there-into. Upon the auto-loader section conveyor belt (174) one notes livestock (154), in this case fowl, and one may readily appreciate that the livestock (154) may be transported into the coop (136) as the said livestock are cycled off the end of the moving auto-loader section conveyor belt (174). Also, one may readily appreciate that as livestock (154) are deposited in the coop (136), the auto-loader section (124) conveyor belt (174) may be progressively withdrawn from the coop (136) as the coop (136) is thusly filled.

Figure 2C:
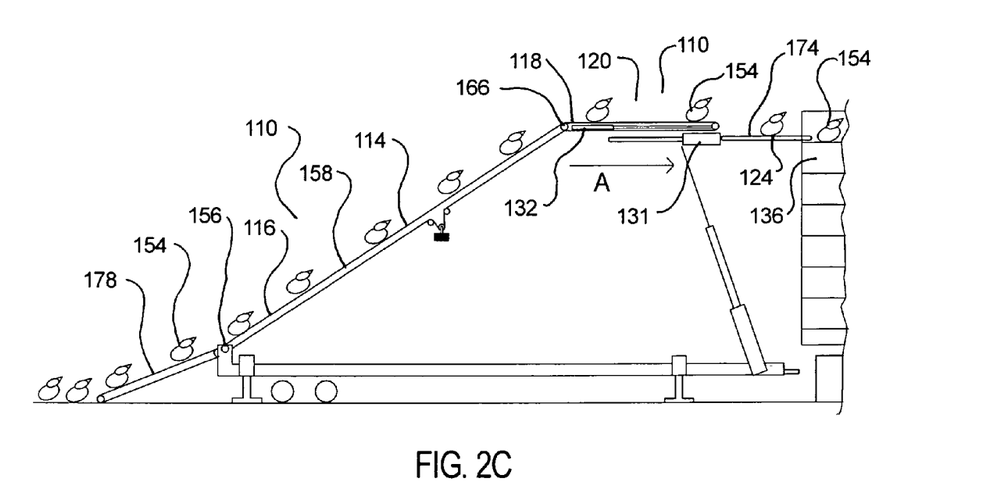
FIG. 2C is a side view of the device with livestock.
Figure 6:
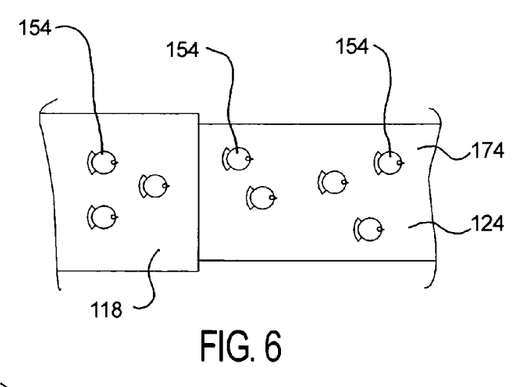
FIG. 6 is a partial top view of the device.

Turning back to FIG. 2C, one may now readily appreciate that these livestock (154), may be herded onto the pre-loader (112) and transported by conveyor belt (158) to the main conveyor (114) where the animals (154) may then be moved up the lift section (116) to the top section (118) by conveyor belt (158). The conveyor belt (158) then discharges the animals (154) from the end of the top section (118), which end is referred to as a drop-end (170) as livestock drop therefrom to the auto-loader conveyor belt (178), and deposits them upon the auto-loader (124), as shown in FIG. 6, whereupon they are loaded into a coop (136) as previously described and shown in FIG. 8, FIG. 9, and FIG. 10.

FIG. 13, FIG. 13A, FIG. 13B, and FIG. 13C show that the pre-loader (112) may comprise a receiving section (196) and a riser section (198), said sections communicating at a pivot point (200) such that said sections articulate one relative the other. Also seen is that the pre-loader conveyor belt (178) traverses both pre-loader sections (196, 198) and that the pre-loader conveyor belt (178) comprises substantially planar surfaces substantially parallel to the ground (168).

Also seen is a livestock guide (206) having substantially the same length as the receiving section (196) disposed substantially normal thereto and substantially longitudinally coaxial or substantially parallel to the receiving section (196) longitudinal axis. The livestock guide (206) is movable from one side of the receiving section (196) to the other. Thus, it may be readily appreciated that the receiving section (196) may rest upon the ground (168) while the riser section (198) communicates with the main conveyor section (114), as shown in FIG. 13.

Shown additionally is one or more litter panels (208) pivotably communicating with the receiving section (196) at essentially the entire length thereof at essentially the level of the pre-loader conveyor belt (178).

Figure 13:
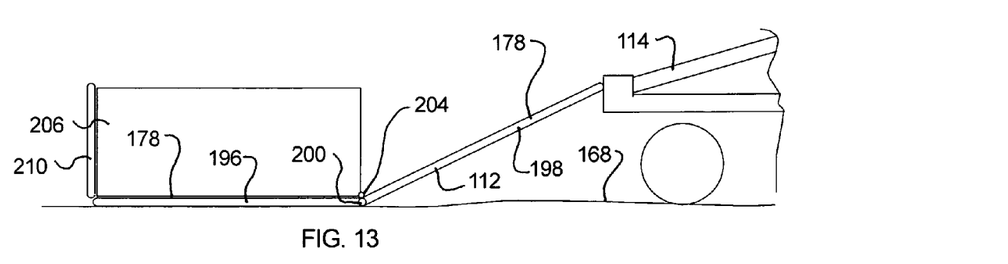
FIG. 13 is a side view of an alternate embodiment of pre-loader.
Figure 13A:
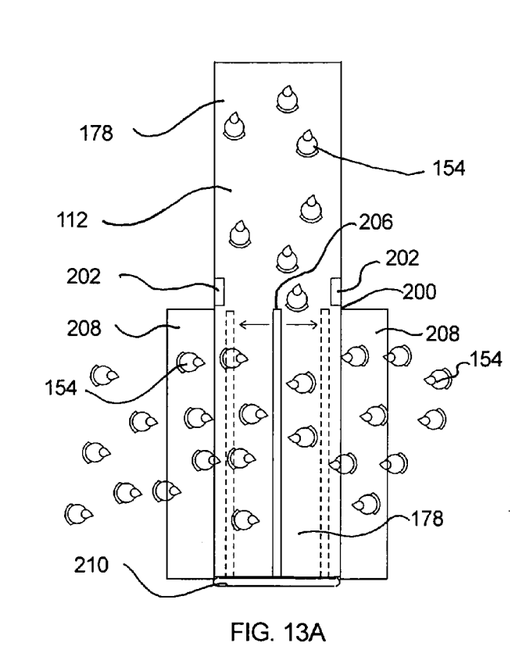
FIG. 13A is a top view of an alternate embodiment of pre-loader.
Figure 13B:
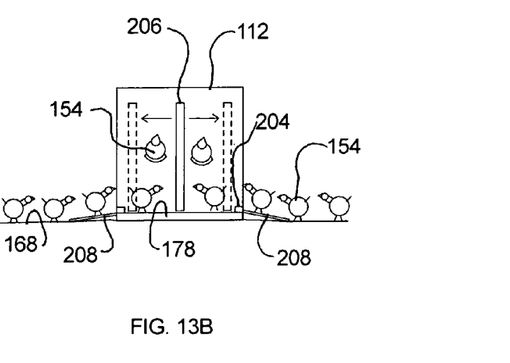
FIG. 13B is a front view of an alternate embodiment of pre-loader.
Figure 13C:
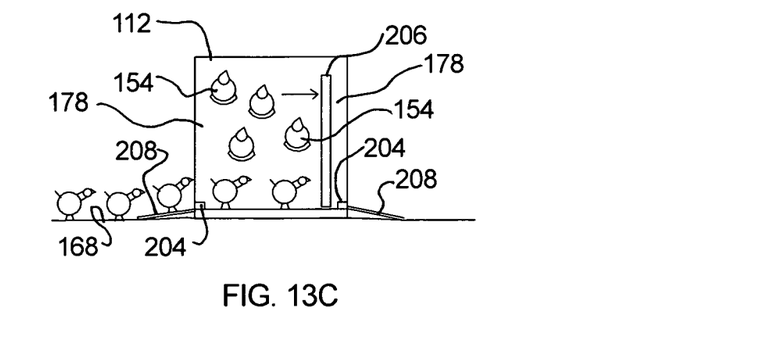
FIG. 13C is a front view of an alternate embodiment of pre-loader.
Figure 13D:
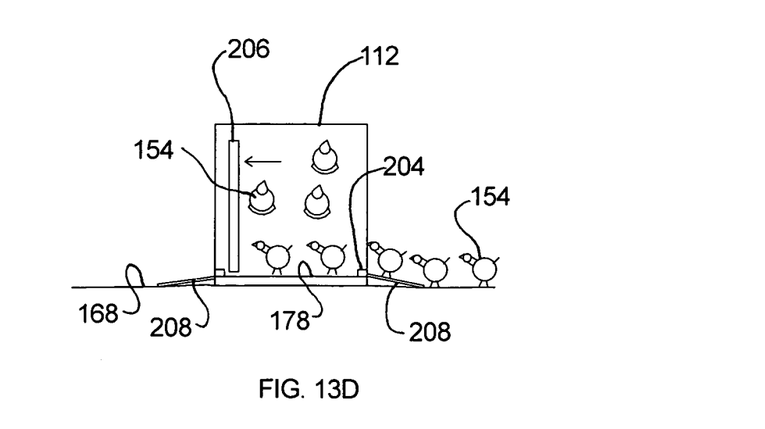
FIG. 13D is a front view of an alternate embodiment of pre-loader.
Figure 13E:
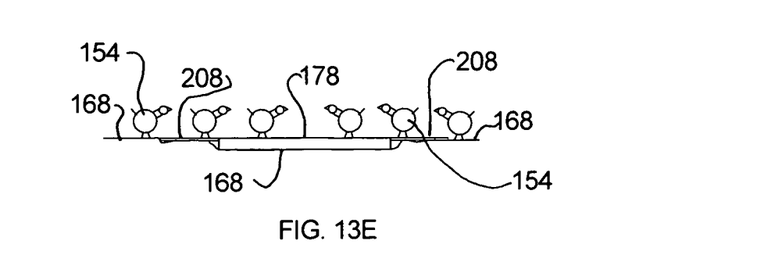
FIG. 13E is an end view of an alternate embodiment of pre-loader

Thus, as seen in FIG. 13B, FIG. 13C, and FIG. 13D the one or more litter panels (208) may articulate relative the pre-loader conveyor belt (178) so that if the ground (168) is substantially regular causing the pre-loader conveyor belt (178) to be above said ground (168) while the receiving section is resting thereupon, means of communication with the ground (168) and the pre-loader conveyor belt (78) is provided. Also, FIG. 13E shows that if the ground (168) which at many livestock loading and unloading premises customarily comprises a coarse, loose composition, generally referred to as "litter," is dug out or otherwise manipulated so that portions of the ground (168) are substantially level to or even with the pre-loader conveyor belt (178), the one or more litter panels (208) may articulate so that communication between the ground (168) and the pre-loader conveyor belt (178) is provided.

FIG. 13 and FIG. 13A additionally show that the receiving section (196) may comprise a livestock barrier (210) disposed at an extreme end of the receiving section (196) opposite the pivot point (200) substantially normal to the pre-loader conveyor belt (78) and substantially normal to the direction of motion, indicated by arrow, of the pre-loader conveyor belt (178).

It may be readily appreciated that when sections of conveyor belt systems having a common conveyor belt articulate one relative the other, as in the instant art (210), said belt will tend not to remain in previous orientation relative elements of said systems, especially proximal the point of said articulation. Thus, when said articulation occurs, the belt may lose contact with supporting elements, drive elements, guide elements, barrier elements or the like, or said belt movement may obstruct or impede proper function of such elements.

Therefore, the instant art (110) may comprise any or combination of any known means to maintain said belt in proper orientation as sections are articulated. In example, FIG. 13, FIG. 13B, FIG. 13C, and FIG. 13D show belt guide rollers (204) disposed proximal pivot point (200) to restrict receiving section (196)/riser section (198) articulation caused pre-loader section conveyor belt (178) movement. Also, FIG. 13A shows belt guide pads (202) oriented proximal the pivot point (200) which belt guide pads (202) restrict receiving section (196)/riser section (198) articulation caused movement.

In light of FIG. 2, it may be readily appreciated that the pre-loader may have one extreme which communicates with the ground (0.168) and an opposite extreme which communicates with the main conveyor belt (158). Thus, livestock (154) may be loaded by herding them over the extreme communicating with the ground (168) and onto the pre-loader (112) whereupon the pre-loader conveyor belt (178) transports said livestock (154) to the main conveyor belt (158).

In light of FIG. 13, FIG. 13A, FIG. 13B, FIG. 13C, and FIG. 13D, it may be readily appreciated that livestock (154) may enter the receiving section from the side by treading from the ground (168) and across the litter panel (208) and thence to the pre-loader conveyor belt (178) whereupon said livestock (154) will be conveyed from the receiving section (196) to the riser section (198) and thence to the main conveyor section (114) to be disposed as previously described. Also seen is that the livestock guide (206) will prevent livestock (154) from entering one side of the receiving section (196), walking across said section (196), and exiting the other side.

Additionally, it will be noted that the livestock guide (206) may move from one side of the receiving section to the other. Thus, if livestock (154) are to enter the receiving section from only one side, the livestock guide (206) may move toward the opposite side to maximize portion of the pre-loader section conveyor belt (178) accessible to said livestock (154) and thereby maximize number of livestock that may enter receiving section (196) and minimize time required for said entry.

However, it will also be noted that livestock (154) may enter both sides of the receiving section (196) at once. In such case, the livestock guide (206) may move so that area of receiving section (196) accessible from both sides is maximized, in example to proximal the middle of the receiving section (196). Also, it may be understood that the side of the receiving section (196) receiving livestock may be alternated and the livestock guide (206) moved as appropriate to maximize said reception. Also, if livestock (154) are being loaded from both sides but at different rates, the livestock guide (206) may move toward the side receiving at the lower rate.

The livestock guide (206) may be moved by the impetus of contact therewith by livestock being loaded or according to direction from an operator or control unit (180). In addition, the livestock guide (206) may be removably fixed in one position.

Now one may readily appreciate that the working elements of the loader (110) are carefully contrived so that the movement of animals by conveyor belts and the transfers of animals from one conveyor to another and/or from a conveyor belt to the interior of a cage or coop (136) are smoothly achieved with a humane minimum of pushing or shoving or other raw force.

In addition, due to certain factors, in example the volitional nature of livestock (154) and their freedom, albeit limited, to move at virtually any step in the loading process, the livestock (154) locations on various conveyor belts and their depositions from locations on one conveyor belt to locations on other conveyor belts may appear to be random.

Looking again at FIG. 2, one notes that the major assembly (120) comprises the top section (18) from which depends, the auto-loader section (124).

Now one may readily appreciate that the sundry elements comprising the device (110) may communicate with each other and be supported by various types of frameworks. Said framework types and dispositions are well known and are not claimed and therefore are not depicted in the figures or the descriptions for the sake of clarity and/or brevity. In addition, one may also readily appreciate that controls for the operation of the various elements of the device (110) may be placed at any number of convenient locations about the device (110) and that structures to house and/or support operators may be similarly disposed about the device (110), many effective dispositions of said controls and operator housings being known.

The motive force for elements of the instant art (110) has been described as being provided by cylinders having pistons extended or retracted by hydraulic or pneumatic force. However, one skilled in the art will readily appreciate that suitable motive force may be provided by other means. In example, FIG. 5 and FIG. 5B show a rack and pinion motive force arrangement (211) for extension and/or retraction of the auto-loader (124). Depicted thereby is a rack (182), which may be stationary, communicating with a rotating pinion (184), said communication be means of intermeshing teeth (212). The pinion (184) is mounted on a shaft (214) which passes through a bushing or bearing (216) fixedly attached to the auto-loader (124). Communicating with the shaft (214), opposite the pinion (184), is a motor (218).

Thus, as the shaft (214) is rotated by said motor (218), in example in direction indicated by curved arrow, the pinion (184) will rotate causing movement relative the rack (182) and attached auto-loader (124) in direction of straight arrow. By reversing said rotation of pinion (184), movement of pinion (184) and attached auto-loader (124) may be reversed. Thus, auto-loader (124) may be extended or retracted by rack and pinion arrangement (211) as described. The motor (218) may comprise any device suitable for applying rotation or torque to a shaft, in example, an electric motor or an orbit motor.

FIG. 12 shows that the rack and pinion motive force arrangement (211) may be substituted for the extension-cylinder mechanism(132), the lift-cylinder mechanism (126), auto-loader section extension-cylinder mechanism (131), top section extension-cylinder mechanism (132), and or the tilt-cylinder mechanism (150). One skilled in the art will realize that other extension or retraction means may be substituted as well, in example, screw jack, rack and worm gear, chain and sprocket, track and sprocket.

Also, one skilled in the art will readily appreciate that by eliminating cylinders having pistons extended or retracted by hydraulic or pneumatic force, necessary ancillary elements such as compressors, pumps, air lines, hydraulic lines, hydraulic fluid reservoirs, air tanks, valves, and the like might also be eliminated thus simplifying the instant art and the operation thereof. In addition, each rack and pinion arrangement (211), or other extension or retraction means, may comprise sensor, receiver, and transmitter, receiver, and transmitter means (220) to communicate data to the central control module (180) so that the instant art (110) may be operated as previously described.

Further, one may readily appreciate that all elements of the device (110) may be arranged on the trailer (128) so that all may be transported from place to place and the device (110) configured for transport at one location with minimum of time and effort, and set up for operation at another location with minimum of time and effort.

Figure 14:
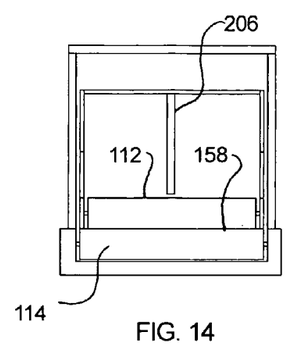
FIG. 14 is a front view of pre-loader stowed.
Figure 14A:
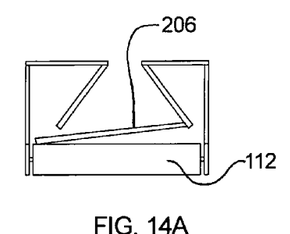
FIG. 14A is a front view of pre-loader configured for stowing.

In particular, FIG. 14 shows that the pre-loader (112) may be configured to rest upon the main conveyor section conveyor belt (158) in travel mode. FIG. 14 A shows that elements of the pre-loader (112), in example the livestock guide (206) and supporting elements, may break down and/or fold into a more compact configuration to facilitate stowage in contact with the main conveyor belt (158).

Figure 14B:
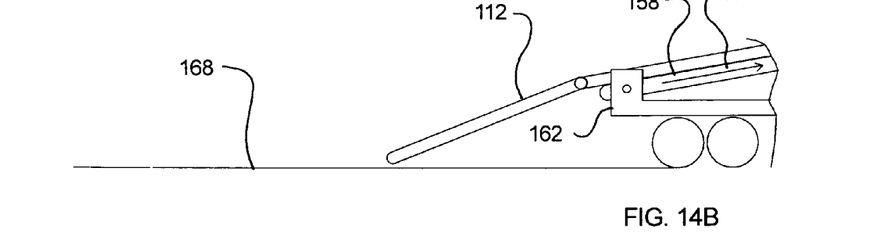
FIG. 14B is a side view of pre-loader during stowing.

FIG. 14B shows that when the pre-loader (112) is being stowed and a portion thereof is resting upon the main conveyor belt (158), said stowage may be expedited by engaging the drive for said main conveyor belt (158) so that the pre-loader (112) will be borne thereby in the direction of the arrow. Thusly, the pre-loader (112) may be drawn up upon the main conveyor belt (158) and into stowed disposition. Also seen in FIG. 14B, as well as in FIG. 2A, is that the trailer (128) may comprise a winch (260) or like device which may communicate with the pre-loader to draw the pre-loader up upon the main conveyor belt (158) into stowed disposition or to assist in said stowing.

In addition, FIG. 2A shows that, for relocation movement, elements of the instant art (110) in example the main conveyor section (114) and/or the top section (120) may be secured by means of cushions (256) and tie downs (254). The cushions (256) are placed between the trailer frame (162) and an element, in example the main conveyor section (114) and/or the top section (120) and tie downs (254) are arranged to press the said elements (114 and/or 120) down upon the cushions (256) while braced by the trailer frame (162).

Ideally, the cushions (256) are rigid enough to prevent unnecessary movement of the cushioned element but flexible or resilient enough to prevent transfer of damaging shock to said cushioned element. The trailer frame (162) may further comprise a storage compartment (258) for disposition of tie downs (254) or cushions (256) when not in use.

FIG. 2A also shows that in alternative to stowage upon the main conveyor belt (158), the pre-loader (112) may rest upon the trailer frame (162) between it and the main conveyor section (114).

As is well known, conveyor belt systems, especially those comprising the instant art (110), comprise a loop (252) of a conveyor belt mounted upon rollers. Thus, as the loop (252) rotates around the rollers, the loop (252) will have an upper part (238) and a lower part (240) which will travel in different directions. The loop (252) will have an inner surface (244) and an outer surface (242) with the upper loop part (238) outer surface (242) bearing and moving items.

Figure 15:
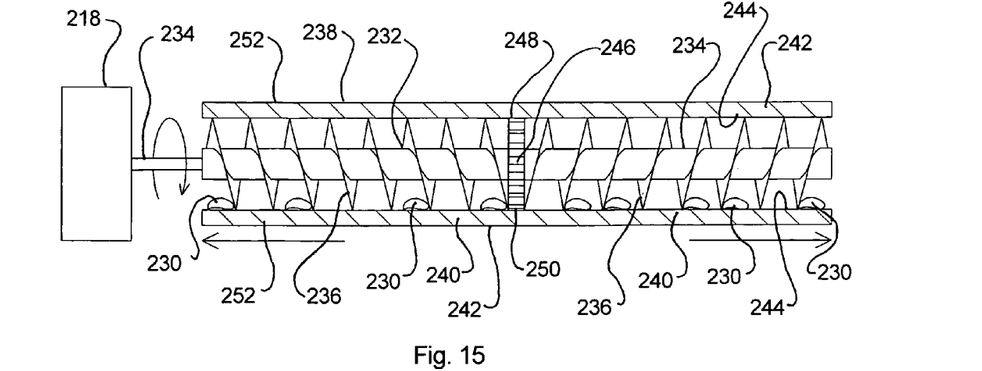
FIG. 15 is a front view of debris removal element.

Further, as a consequence of normal operation of the instant art (110), debris (230) will tend to build up on the inside of the various conveyor belt loops (252). Thus, the instant art (110) may comprise means to remove said debris (230). In example, as shown in FIG. 15, the instant art may have an auger (232) comprising a shaft (234) having two helical ridges or threads (236) extending from proximal each end of the shaft (234) to essentially the middle of the shaft (234) with said helical ridges or threads (236) having opposite pitches or turnings.

The auger (232) is disposed between the upper loop part (238) and the lower loop part (240) essentially contiguous with the loop inner surface (244). Also seen, is that the auger (232) may be rotated by a motor, in example electrical or orbit, communicating with the auger shaft (234). Alternately, the auger (232) may comprise a gear or sprocket (246), having teeth, proximal the middle of the auger shaft (234). The loop inner surface (244) may comprise a track (248) having teeth (250) which inter-mesh with the gear or sprocket teeth (250). Therefore, it may be understood that the auger (232) may be rotated as the track (248) moves with the rotating loop (252).

Now, it will be understood that any debris (230) adhering to the loop inner surface (244) will eventually contact the auger (232) by movement of said loop (252). The debris will then be moved towards the ends of the shaft (234) opposite the middle of the shaft (234) and thus be removed from the loop (252) in accordance with action of the helical ridges or threads (236) as described in detail by Archimedes in the third century B.C.

Figure 7:
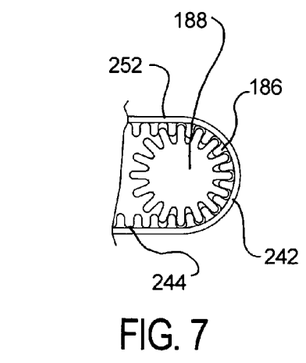
FIG. 7 is side view of conveyor belt drive means.
Figure 7A:
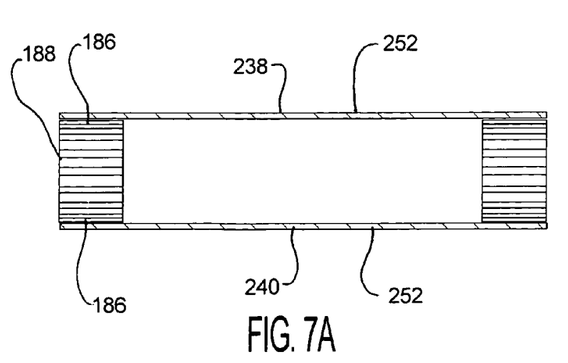
FIG. 7A is a front view of conveyor belt drive means.

There are sundry known means to rotate conveyor belt loops (252). FIG. 7 and FIG. 7A show a preferred means to rotate conveyor belt loops (252) comprising the instant art (110).

Seen are the conveyor belt loop (252) having an upper part (238) and a lower part (240) comprising an inner surface (244) and an outer surface (242). Disposed therebetween, communicating with the conveyor belt loop inner surface (244) is a drive gear or sprocket (188) having teeth (250). Also seen is that the conveyor belt loop inner surface (244) comprises a conveyor belt drive track (186) having teeth (250). The teeth (250) of the drive gear or sprocket (188) and the teeth (250) of the conveyor belt drive track (186) inter-mesh. Thus, as the drive gear or sprocket (188) rotates, said inter-meshing teeth (250) transfer rotation from the drive gear or sprocket (188) to the conveyor belt loop (252). Said conveyor belt drive means is simple and can be light weight. It also tends to minimize belt slippage and walking.

Thusly, by the above provisions, the loading of livestock may be made more efficient, thereby advancing the art While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for loading livestock via conveyor belts, comprising:
    a main conveyor comprising a lift section and a top section, and a conveyor belt traversing the lift section and the top section;
        said lift section and top section joined and articulated each relative to each other, said articulation creating an angle of articulation between them, the main conveyor being raisable or lowerable, said top section having a distal end with respect to a juncture of said lift section and said top section, a distance between said distal end and said juncture being selectively adjustable;

the device also comprising an auto-loader section depending from the top section;

the top section, and the auto-loader section each comprising a conveyor belt, each belt comprising a transport surface portion having a length and each belt functioning independently of the other in speed of motion, direction of motion, extension, retraction, and transport surface portion length;

said auto-loader section conveyor belt being independently extendable or retractable with respect to said main conveyor; and said device also comprising a trailer having a frame, whereby the device is movable from place to place wherein said main conveyor belt includes a serpentine conveyor belt, comprising a slack loop and a means of exerting tension on the slack loop, whereby tension can be maintained on the serpentine belt by permitting the size of the slack loop to vary with extension or retraction of the top end section.

2. A device as in claim 1, further having a detached pre-loader comprising a conveyor belt, having a transport surface portion, said conveyor belt being independently variable in speed of motion, direction of motion, extension, retraction, and length of transport surface portion with respect to said main conveyor, said pre-loader able to communicate with the main conveyor.

3. A device for loading livestock via conveyor belts, comprising:

a main conveyor portion, comprising a lift section and a top section, and a conveyor belt traversing the lift section and the top section;

said lift section and top section joined and articulated each relative to each other, said articulation creating an angle of articulation between them;

the main conveyor being raisable or lowerable, the top section being extendable and retractable;

the device also comprising an auto-loader section depending from the top section;

the top section, and the auto-loader section, each comprising a conveyor belt, each belt comprising a transport surface having a length, and each belt functioning independently of the other and independently variable in speed of motion, direction of motion, extension, retraction, and transport surface length of length each relation to the other;

said device also comprising a trailer having a frame, whereby the device may be moved from place to place;

and also comprising a detached pre-loader, said pre-loader comprising an independent conveyor belt having a transport surface portion, said conveyor belt independently variable in speed of motion, direction of motion, extension retraction, and length of transport surface portion, conveyor belt, said pre-loader able to communicated with the main conveyor, said auto-loader section conveyor belt being independently extendable or retractable with respect to said main conveyor wherein said main conveyor belt includes a serpentine conveyor belt, comprising a slack loop and a means of exerting tension on the slack loop, whereby tension can be maintained on the serpentine belt by permitting the size of the slack loop to vary with extension or retraction of the top end section.

4. A device as in claim 3, wherein the top section comprises a discharge-end from which the livestock are transferred onto the autoloader, said discharge-end manually positionable by an operator, wherein, once an operator positions the top section discharge-end in a selected plane, said plane essentially normal to the longitudinal axis of the trailer frame, then adjustment of the main conveyor upward or downward, causes the top section to automatically extend or retract the discharge-end in response to said upward or downward adjustment in such a way as to maintain the discharge-end of the autoloader within the said selected plane, and wherein the articulation angle is concurrently and automatically varied in response to upward and downward adjustment of the main conveyer such as way as to maintain the autoloader in a plane essentially parallel to the plane of the trailer frame.

\* \* \* \* \*